United States Patent
Meyer et al.

(10) Patent No.: US 9,013,470 B2
(45) Date of Patent: Apr. 21, 2015

(54) METHOD AND DEVICE FOR DISPLAYING INFORMATION, PARTICULARLY IN A VEHICLE

(75) Inventors: Oliver Meyer, Berlin (DE); Holger Wild, Berlin (DE)

(73) Assignee: Volkswagen AG, Wolfsburg (DE)

( * ) Notice: Subject to any disclaimer, the term of this patent is extended or adjusted under 35 U.S.C. 154(b) by 857 days.

(21) Appl. No.: 13/123,504

(22) PCT Filed: Oct. 7, 2009

(86) PCT No.: PCT/EP2009/063041
§ 371 (c)(1),
(2), (4) Date: Jul. 5, 2011

(87) PCT Pub. No.: WO2010/040782
PCT Pub. Date: Apr. 15, 2010

(65) Prior Publication Data
US 2011/0261051 A1    Oct. 27, 2011

(30) Foreign Application Priority Data
Oct. 8, 2008   (DE) .................. 10 2008 050 803

(51) Int. Cl.
*G06T 15/00*   (2011.01)
*B60K 35/00*   (2006.01)
(Continued)

(52) U.S. Cl.
CPC *B60K 35/00* (2013.01); *G09G 3/32* (2013.01); *G06T 3/403* (2013.01); *B60K 37/06* (2013.01); *B60K 2350/1012* (2013.01); *B60K 2350/1024* (2013.01); *B60K 2350/2017* (2013.01)

(58) Field of Classification Search
CPC .............................. G06T 3/403; G09G 3/32
USPC ......... 345/419, 835, 418; 715/764, 805, 835, 715/838; 463/32
See application file for complete search history.

(56) References Cited

U.S. PATENT DOCUMENTS 5,270,689 A    12/1993   Hermann
5,339,390 A    8/1994   Robertson et al.
(Continued)

FOREIGN PATENT DOCUMENTS

DE    199 41 956    3/2001
DE    199 41 960    3/2001
(Continued)

OTHER PUBLICATIONS

International Search Report and Written Opinion, issued in corresponding International Application No. PCT/EP2009/063041.
(Continued)

*Primary Examiner* — Phu K Nguyen
(74) *Attorney, Agent, or Firm* — Kenyon & Kenyon LLP

(57) ABSTRACT

In a method for displaying information, particularly in a vehicle, at least one object for conveying a portion of gross information is represented graphically in at least one first display mode with the aid of a display mounted, e.g., in the vehicle, and as a function of a control signal of a control device, graphic data are generated which alter the representation of the graphical object such that the graphical object changes over to at least one second display mode. In the second display mode, the object is shown swiveled about an axis in a perspective or three-dimensional manner relative to the first display mode of the object, and the portion of the gross information conveyed by the object is greater in the second display mode than the portion of the gross information conveyed by the object in the first display mode. A corresponding display device is adapted to perform the method described above.

16 Claims, 2 Drawing Sheets

(51) Int. Cl.
*G09G 3/32* (2006.01)
*G06T 3/40* (2006.01)
*B60K 37/06* (2006.01)

(56) References Cited

U.S. PATENT DOCUMENTS

| | | | |
|---|---|---|---|
| 5,754,809 A | 5/1998 | Gandre | |
| 5,995,104 A | 11/1999 | Kataoka et al. | |
| 6,636,246 B1 * | 10/2003 | Gallo et al. | 715/805 |
| 6,769,320 B1 | 8/2004 | Bollgohn et al. | |
| 6,781,610 B2 * | 8/2004 | Os et al. | 715/764 |
| 7,538,760 B2 | 5/2009 | Hotelling et al. | |
| 7,581,195 B2 * | 8/2009 | Sciammarella et al. | 715/838 |
| 8,012,019 B2 * | 9/2011 | Escalera et al. | 463/32 |
| 2003/0103088 A1 * | 6/2003 | Dresti et al. | 345/835 |
| 2004/0100460 A1 | 5/2004 | Yamada et al. | |
| 2005/0280602 A1 | 12/2005 | Tzschoppe et al. | |
| 2006/0285206 A1 | 12/2006 | Tzschoppe | |
| 2007/0157126 A1 | 7/2007 | Tschirhart et al. | |
| 2007/0182718 A1 | 8/2007 | Schoener et al. | |
| 2008/0161997 A1 | 7/2008 | Wengelnik et al. | |

FOREIGN PATENT DOCUMENTS

| | | |
|---|---|---|
| DE | 199 44 324 | 3/2001 |
| DE | 100 58 244 | 5/2002 |
| DE | 103 05 341 | 8/2004 |
| DE | 103 09 194 | 10/2004 |
| DE | 103 20 530 | 11/2004 |
| DE | 103 24 579 | 12/2004 |
| DE | 10 2004 048 956 | 4/2006 |
| DE | 10 2005 017 313 | 10/2006 |
| DE | 10 2005 020 155 | 11/2006 |
| DE | 10 2006 032 118 | 1/2008 |
| EP | 0 366 132 | 5/1990 |
| EP | 1 081 644 | 3/2001 |
| EP | 1 212 208 | 6/2002 |
| EP | 1 840 715 | 10/2007 |

OTHER PUBLICATIONS

Recker Traffic Assist, Redienungsanleitung, p. 2-74.

* cited by examiner

METHOD AND DEVICE FOR DISPLAYING INFORMATION, PARTICULARLY IN A VEHICLE

FIELD OF THE INVENTION

The present invention relates to a method for displaying information, particularly in a vehicle, in which at least one object for conveying a portion of gross information is represented graphically in at least one first display mode with the aid of a display mounted, e.g., in the vehicle, and as a function of a control signal of a control device, graphic data are generated which alter the representation of the graphical object such that the graphical object changes over to at least one second display mode. The present invention further relates to a display device, particularly for a vehicle, having a display for the graphical representation of information which is mounted, e.g., in the vehicle, a memory for storing gross information, a control device by which graphic data are able to be generated that render at least one graphical object, able to be shown on the display, in a first display mode in which a portion of the gross information stored in the memory is displayed, and an input device for generating a control signal by an operator action in order to alter the displayed portion of the gross information.

BACKGROUND INFORMATION

Various types of information are usually displayed in a vehicle which, in particular, represent visually to the driver, data related to the operation of the vehicle. Traffic-related data may also be displayed in the vehicle for the driver. Formerly, analog mechanical indicating instruments were used to display this information. In particular, they were disposed within what is referred to as the instrument cluster in the vicinity of the primary field of view of the driver behind the steering wheel. The instrument cluster is used especially to indicate the speed, the fuel-tank level, the radiator temperature and other information specific to vehicle operation.

With the increase of electronic devices in the vehicle, it became necessary to display a greater quantity of information in the vehicle. For instance, modern vehicles include a multitude of driver-assistance systems whose information must be displayed in the vehicle. Furthermore, vehicles in many cases include a navigation system. Digital geographical roadmaps, together with a route and possibly various additional information, are able to be displayed by such a navigation system. Finally, modern vehicles frequently include communications and multimedia applications, including a mobile-phone interface and devices for the playback of music and speech. The possibility must exist for displaying information in the vehicle for these applications, as well.

For this reason, multifunction operating systems are frequently used in vehicles, which include one or more multifunction displays and operating elements by which the various devices contained in the vehicle are able to be operated. In this case, the operator control is assisted or guided by the information conveyed on the multifunction display. Moreover, using the operating system, it is possible to select what information is to be displayed on the multifunction display.

To permit flexible display of the varied information, freely programmable displays are used, for instance, which often take over the conveying of information by conventional mechanical instruments, as well. For example, German Published Patent Application No 10 2006 032 118 describes an instrument cluster for a motor vehicle which includes a display by which the velocity of the motor vehicle, the engine speed of the motor vehicle, the temperature of the engine of the motor vehicle, the tank fuel level and/or the time are able to be variably displayed. In addition, it is possible to display information of a navigation system, a telephone, a music system, an infotainment system and or an air-conditioning system.

In addition to the instrument cluster, frequently a display device is placed above the center console of the vehicle, by which further information may be displayed. This display device is used particularly as a multifunction display and for showing a geographical map of a navigation system. Such a multifunction display is described, for example, in German Published Patent Application No. 199 41 956.

The multifunction displays are operated in conjunction with an operating system that may include various operating elements. For example, in German Published Patent Application No. 199 41 956, a plurality of selection and function keys are provided for controlling the vehicle devices. On the other hand, German Published Patent Application No. 199 41 960 describes a multifunction operating element for selecting functional groups and individual functions, which includes a bidirectionally rotatable cylinder that, in addition, is movable in a direction perpendicular to the axis of rotation.

Furthermore, European Patent No. 0 366 132 describes a multifunction operating device in which functional groups and individual functions are selected with the aid of a rotary pressure-operated switch, the switch being operable in the direction of the axis of rotation. German Published Patent Application No. 199 44 324 describes a multifunction operating device, which has a rotary switch for selecting functions that are displayable within a display field of a display. Positioned around the rotary switch are pressure-operated switches, to which display fields of the display are likewise assigned. Finally, German Published Patent Application No. 103 24 579 describes an operating device for controlling vehicle devices, which has a touch-sensitive operator control panel.

In addition to the remote operating elements described above, it has further been proposed to provide the display itself with a touch-sensitive surface, and in this manner, to make what is referred to as a touchscreen available. In the case of such a touchscreen, the user touches the touchscreen with his/her fingertip, for example, in order to implement the operator control. The position of the contact is detected, evaluated, and assigned to an operating step. Virtual switches may be represented as graphical buttons on the display to assist the user in the operator control. A display device having a touch-sensitive surface, which is used in conjunction with a navigation system, is described, for example, in German Published Patent Application No. 10 2005 020 155.

Very special requirements arise for the display of information in a vehicle and for the operation of the various devices of the vehicle. The information is comprehended and the operation is carried out in the vehicle, inter alia, by the driver. The information should therefore be displayed in the vehicle such that as the driver is absorbing the information, he is not distracted while driving. The driver should therefore be able to comprehend the displayed information intuitively and quickly, so that he only has to turn away very briefly from what is happening on the road in order to absorb the information. Likewise, the vehicle devices should be operable as easily and intuitively as possible, so that the driver is able to operate the devices even while driving. If the operation is assisted or guided by a display, the display should be implemented such that for the operation, the driver only has to look at the display very briefly in order to carry out the operation.

In many cases, information is displayed in a vehicle in a manner that a portion of the gross information is displayed on the display area in the vehicle, and the user is able to alter the portion. For example, the gross information may relate to a list having a plurality of list entries. A portion of the list entries from the total list is displayed. By an operator action, the user is able to induce scrolling in order to display other list entries. For instance, during the operator action, the user may perform an operating movement of a specific length. In addition, for instance, the user may manipulate an operating element for a specific operating duration. The magnitude of the change or the extent to which the displayed information is changed, that is, in this case, the number of positions by which the list entries which are displayed changes, is a function in this case of the length of the operating movement or the operating duration.

If the gross information includes a very large volume of data like, for example, a very long list having many list entries or a geographical map, the problem arises that the operator action for scrolling to very remote list entries or areas of the map demands a high degree of time and attention on the part of the user. However, as explained above, this is disadvantageous for practical application in a vehicle.

SUMMARY

Therefore, example embodiments of the present invention provide a method and a device of the type indicated at the outset, by which the displayed portion of the gross information is able to be changed in a manner that is easy and intuitive for the user, such that the operator action necessary for that purpose may be carried out as quickly as possible, and the lowest possible degree of attention is demanded of the user.

In the method of example embodiments of the present invention, in the second display mode, the object is shown swiveled about an axis in a perspective or three-dimensional manner relative to the first display mode of the object, and the portion of the gross information conveyed by the object is greater in the second display mode than the portion of the gross information conveyed by the object in the first display mode The perspective or three-dimensional swiveling of the graphical object results in a larger portion of the gross information being represented by the object. A user thereby gets a big preview of a portion of the gross information which is not shown in the first display mode. Such a big preview is especially advantageous when the user wants to change the represented portion of the gross information.

For example, the graphical object may be a two-dimensional object which, for instance, is shown in a top view in the first display mode. In this case, the graphical object may completely fill up the display or a partial area of the display. During the transition from the first display mode to the second display mode, the object is swiveled perspectively, for example, so that although the area taken up by the object on the display possibly becomes smaller, the parts of the object which are represented perspectively at the back become smaller in terms of their absolute size on the display, so that all in all, a larger portion of the gross information is rendered such that the observer is able to grasp it quickly and intuitively. Namely, analogous to a real object such as a map the size of the display, because of the perspective representation, it is possible by way of a window the size of the display to view a larger map if it is swiveled about an axis away to the back. On this larger map, it is therefore also possible to place a larger portion of the gross information, which is able to be viewed by the window of the display.

The three-dimensional swiveling of the object may be displayed autostereoscopically. In contrast to the perspective representation, in this case, the one eye of the viewer sees a slightly different image than the other eye, so that a real three-dimensional representation is achieved. When using an autostereoscopic display, no special devices such as glasses or the like are needed to produce the three-dimensional effect when viewing the display.

According to example embodiments of the method, the graphical object is swiveled about a vertical or horizontal axis which, in particular, may coincide with a lateral edge of the graphical object in the first display mode. In addition, the vertical or horizontal axis may pass through a laterally outermost point of the graphical object. In particular, the maximum swiveling angle is in a range of 35° to 55°. Namely, if the maximum swiveling angle becomes too large, the projection of a perspectively represented object on the display area is then too small to still be able to recognize the rendered portion of the gross information.

The portion of the first display mode may be a portion of the second display mode, that is, upon transition from the first display mode to the second display mode, the quantity of information represented is enlarged.

The control device may alter the graphic data such that the portion is shown perspectively or three-dimensionally in the second display mode, the type of the perspective or three-dimensional representation being a function of the swiveling angle. Thus, not only is the graphical object shown perspectively or three-dimensionally, but also the information conveyed by the object, analogous to the swiveling of a real two-dimensional object on which the information is imprinted. In this case, the size of the portion conveyed by the graphical object is a function in particular of the swiveling angle by which the graphical object is swiveled. The term size in this context relates to the quantity of information and not to the geometrical size in the case of the display.

The control device may alter the graphic data such that in the second display mode, the information displayed perspectively or three-dimensionally in front is rendered with a greater depth of detail than the information displayed perspectively or three-dimensionally in the back. This type of representation is especially advantageous if the rendered information has a hierarchical structure. In this case, the information displayed perspectively or three-dimensionally in front may belong to a higher hierarchy level than the information displayed perspectively or three-dimensionally in the back.

In the method, the control signal is generated in particular due to an operator action on the part of a user. According to example embodiments of the present invention, the portion of the gross information displayed is also changed owing to this operator action. The control signal produced by the user thus triggers two occurrences: First of all, the graphical object is transferred from the first display mode to the second display mode in which the object is shown swiveled perspectively or three-dimensionally, and in which a larger portion of the gross information is displayed. Secondly, the displayed portion of the gross information may be altered due to the operator action. However, since a greater portion is displayed to the user in the second display mode, this display mode allows him a further preview, so that he is able to alter the displayed portion of the gross information more quickly by the operator action in order to arrive at the desired portion. The operator action for altering the displayed portion is thereby shortened. If the operator action is performed by the driver of the vehicle, the method therefore contributes to the safe driving of the vehicle, since the driver is less distracted by the operator action.

According to example embodiments of the present invention, the gross information is a list having a plurality of list entries, of which only a portion is displayed. The number of list entries in the portion is a function of the swiveling angle. Fewer list entries are displayed in the first display mode than in the second display mode. Thus, the transition from the first display mode to the second display mode gives the user a large preview of further list entries. In this case, the change in the displayed portion of the gross information corresponds to a scroll through the list. In return for the operator action of the scroll through the list, the list is therefore shown on the perspectively or three-dimensionally swiveled object, where a larger number of list entries are rendered. In this manner, the user is able to scroll through the list more quickly.

According to example embodiments of the present invention, the gross information represents a geographical map, of which only a partial area is displayed, the map section being a function of the swiveling angle. In particular, such a representation of a geographical map is implemented in conjunction with a navigation system of the vehicle. The user is now able to change the map section by the operator action. In doing so—figuratively expressed—the displayed partial area is moved over the total map. In order to be able to display a larger map section in the case of a larger swiveling angle, a larger map scale may be used for the map representation in areas of the object situated perspectively or three-dimensionally further in front than for areas situated further to the back. In this case, the depth of detail in areas of the object situated in the front is therefore greater than in areas situated to the rear, as well. However, since the scale of the map is smaller in areas of the object situated further to the rear, the map section represented is larger overall, so that the user obtains a preview of remotely situated areas of the map. In this case, the swiveling axis is preferably selected such that the object is swiveled perspectively or three-dimensionally to the rear in the direction in which the user wants to shift the map section. This shift direction is determined by the operator action.

According to example embodiments of the present invention, upon conclusion of the operator action, the swiveling angle is reset to the original value, at which the graphical object conveys the portion of the gross information in the first display mode. Therefore, in the method, it is possible to display a larger portion of the gross information in return for the operator action, in order to shorten the duration of the operator action due to the greater preview for a change of the portion.

For example, for the operator action, a surface of the display or a surface of an input device may be touch-sensitive. In this case, the touch-sensitive surface is actuated during the operator action. The display area is therefore part of a touchscreen or the surface of the input device is part of a touchpad. The operator action is performed in a manner that the user touches the touch-sensitive surface of the display or of the input device at a certain position with his fingertip, for example, or executes a certain movement on the touch-sensitive surface. In particular, the operator action for changing the portion of the gross information may be a gesture performed on the touch-sensitive surface, especially a wiping gesture.

According to example embodiments of the present invention, the position of an object, especially the hand or the finger of a user, is detected in a specific area in front of the display. The movement of the object is able to be deduced from the development of this position over time, so that certain gestures performed by the user with his hand may be detected and converted into a corresponding control signal.

Finally, a mechanical operating element may also be manipulated during the operator action.

For instance, during the operator action, an operating movement may be performed, whose speed is detected. In this case, the swiveling angle may be a function of the speed of the operating movement. The faster the operating movement is carried out, the larger the swiveling angle. In addition, the speed with which the displayed portion of the gross information is changed may also be a function of the speed of the operating movement. For instance, if one is scrolling through a list, a rapid operating movement leads to rapid scrolling in the list, and a slow operating movement results in slow scrolling in the list.

Furthermore, an operating duration which is detected may be defined for the operator action. In this case, the swiveling angle and/or the speed with which the displayed portion of the gross information changes is a function of the operating duration. For instance, the operating duration may be defined such that the touching of the touchscreen or the touchpad at a certain position is detected. In addition, the operating duration may be yielded from the continuous pressing or actuation of an operating element. If the operating duration is very long, the swiveling angle is larger and the speed with which the displayed portion of the gross information changes is higher.

According to example embodiments of the present invention, a force exerted by the user during the operator action is detected. In this case, the swiveling angle and/or the speed of the displayed portion of the gross information is a function of the force exerted by the user during the operator action. The greater the force, the larger the swiveling angle and the higher the speed with which the displayed portion changes. For instance, the force exerted when touching the touchscreen or the touchpad may be detected. In addition, the force exerted by the user on a mechanical operating element when manipulating this element may be detected.

In the display device according to example embodiments of the present invention, the graphic data are alterable by the control device such that the graphical object passes over to at least one second display mode in which the object is shown swiveled about an axis in a perspective or three-dimensional manner relative to the first display mode of the object, and the portion of the gross information conveyed by the object is greater than the portion of the gross information conveyed by the object in the first display mode.

In particular, the device is able to partially or completely execute the method described above.

According to example embodiments of the display device, the gross information is a list having a plurality of list entries, of which only a portion is able to be displayed. In this case, the number of list entries in the portion is a function of the swiveling angle. The gross information may further represent a geographical map, of which only a partial area is able to be displayed. In this case, the map section is a function of the swiveling angle.

In particular, the operator action includes the operator actions described above with reference to the method of the present invention. For this purpose, the input device includes a touch-sensitive surface, for example. This surface may be part of what is referred to as a touchpad. In addition, the surface may be formed on the display, that is, the display is a touchscreen. The touchpad or the touchscreen may, in particular, be in the form of a multi-touchpad/touchscreen, that is, the simultaneous touching at different areas is detectable by the touch-sensitive surface. For instance, the size of the area may be a function of the size of the area which is taken up by the touching of the fingertip of a user.

The input device may further include a mechanical operating element. For instance, this operating element is a mechanical rotary actuator, an operating element which is operable in two dimensions, or a joystick in order to shift the displayed portion in various directions on the display area.

The input device may also include a sensor for detecting the actuating speed of the mechanical operating element, for detecting the period the mechanical operating element is touched and/or for detecting the release of the mechanical operating element. For example, the input device may include an infrared-based or capacitive contact sensor system.

The input device may further include a pressure-sensitive surface, by which the force exerted during operation of the input device is detectable. For example, the force may be detected resistively or capacitively. According to example embodiments of the display device, the pressure-sensitive surface is formed on a touchscreen or a touchpad, so that the force may be detected in spatially resolved fashion, that is, it is possible to detect at what location and possibly on which area the force is exerted on the touch-sensitive surface.

Finally, the input device may include a device for detecting the position of an object within the vehicle. In particular, the position of this object is in front of the display. For instance, the object may be the hand of a user. The input may therefore be accomplished by the user bringing his hand into certain positions in front of the display.

According to example embodiments of the display device, the input device may further include a device for detecting the position of an object, especially the hand of a user, in an area in front of the display.

According to example embodiments of the display device, the display may generate an autostereoscopic display. For that purpose, the display is provided with a mask, for instance, for the separation of various intermediate images.

For example, the mask is a wavelength-selective filter mask. This filter preselects the light-propagation directions of the individual subpixels of the display by masking or filtering. Individual color values of the pixels are emitted at various angles into space. In this manner, separate images are able to be generated for the two eyes of the viewer, which are combined in the viewer to form one three-dimensional image. In this context, the image for the one eye shows a slightly offset viewing position relative to the image which is determined for the other eye. Preferably, at least eight autostereoscopic views are displayable simultaneously, the views being able to be radiated into a horizontal view fan. A plurality of stereoscopic view fans are preferably able to be generated side-by-side, and form a view zone. Preferentially, a total of six to eight side-by-side autostereoscopic views are contained in the view fan. The horizontal opening angle of the view fan or view fans in which an autostereoscopic representation is implemented is preferably greater than 15°, and in particular, is between 25 and 30°. An opening angle of 27° is especially preferred. In this manner, a plurality of views may be generated for the viewer at various viewing angles, for which in each case, correct image pairs are radiated at the respective angles for the combination to form one three-dimensional image. The result is that close to the display, one sees two views which are further away from each other. If one goes farther away, the partial views then also widen and the eyes see closer adjoining views. The number of views is a function of the size of the display. In the case of smaller displays whose diagonal is 4 inches, in particular, eight views is considered to be best. For larger displays, 16 or 24 views are also possible.

Example embodiments of the present invention are described in more detail below with reference to the Figures.

SUMMARY

Figure 1:
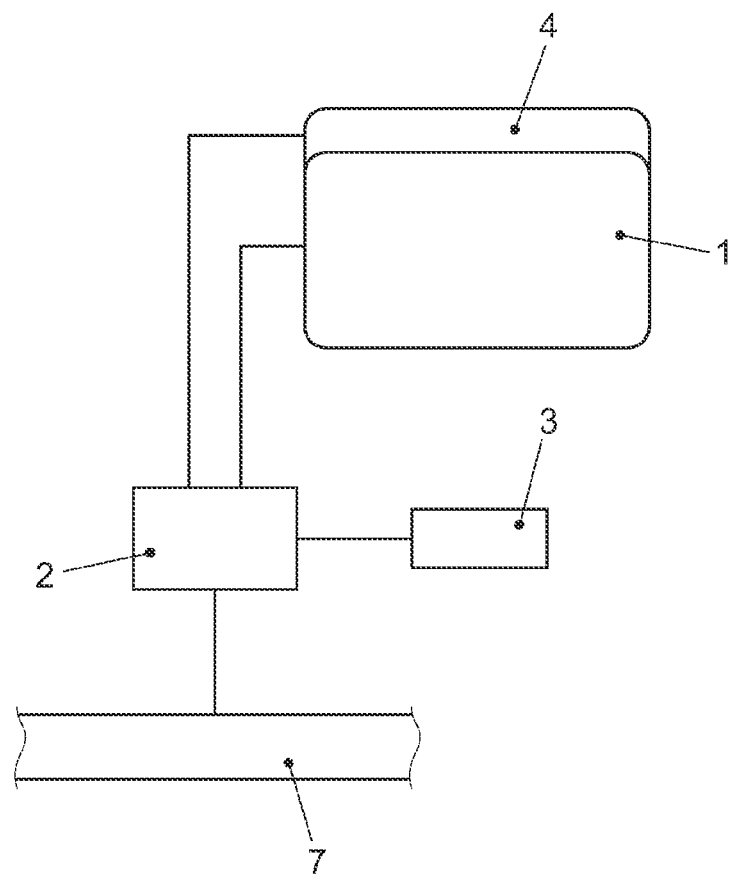
FIG. 1 shows schematically a display device according to an exemplary embodiment of the present invention and the connection of this display device to other devices of the vehicle.

The display device includes a display 1 for the graphical representation of information. Display 1 may be a matrix display, e.g., an LCD (liquid crystal display), especially a color display using TFT (thin-film transistor) technology. Furthermore, the display may be what is referred to as a twisted nematic-liquid crystal display (TN-LCD), a super twisted nematic (STN) display, a double-layer STN, an FLC (ferroelectric liquid crystal) display or an SSFLC (surface stabilized ferroelectric liquid crystal). Display 1 is assigned a back-lighting (not shown) which may be provided by one or more light-emitting diodes. Display 1 is freely programmable, that is, any desired graphic data may be generated, which are represented on display 1.

Optionally, a mask may be disposed in front of display 1 in order to permit an autostereoscopic display. In particular, the mask is a wavelength-selective filter mask or an optical pattern mask. The mask makes it possible to distinguish between partial images which belong to different views, and to radiate each view in a different direction. Partial images may thus be separated for the right and for the left eye of a viewer. When looking at the display device, the partial images are able to be combined to form one three-dimensional view. No further auxiliary aids such as glasses or the like are necessary for this purpose. Reference is made to German Published Patent Application Nos. 103 09 194 and 103 20 530 with respect to further details of the display device.

The separation of the partial images for the three-dimensional image is only possible in a specific solid angle. For example, if the viewer moves in a horizontal plane to the side, the separation of the partial images is canceled and the representation becomes two-dimensional. In order to generate as many image pairs as possible for a correct three-dimensional representation in space, a plurality of views are represented for one display image. The partial images of these various views are radiated horizontally, more or less in a fan shape, so that the horizontal view fan forms. For example, the opening angle of a view fan is 27°. Eight views are preferred when working with a 4-inch large display 1. In this case, the brightness, resolution and the spatial reproduction are sufficient. The resolution of display 1 in this case is greater than 150 dpi.

In particular, display 1 is mounted in an area of the vehicle that is clearly visible for at least the driver. If the operator control of the devices of the vehicle is directly coupled to the placement of the display, so that, for example, the user must bring his hand or his finger at least into the vicinity of display 1 in order to make inputs, then display 1 is positioned such that the driver of the vehicle may easily reach it with his hand or his finger. For instance, display 1 may be accommodated in the center console of the vehicle.

Display 1 is connected to a control device 2, by which graphic data are able to be generated for graphical objects displayable on display 1. Control device 2 is also connected to an input device 4, via which the user is able to control devices of the vehicle whose information is displayed on display 1, as well as the information display on display 1.

For example, input device 4 may be a device for detecting and evaluating a gesture of a body part of a user. The user may perform the gesture with his hand in front of display 1, for instance. In so doing, the three-dimensional position of the hand is detected in a specific location area in front of display 1 without it being necessary to touch display 1. The permitted location area is a function of the placement of display 1 in the vehicle. The area should be selected in such a way that the stay of the hand of a user in this location area may be associated unequivocally with an operative control of input device 4. For instance, the boundary of the location area may lie 40 cm to 10 cm in front of display 1. If the hand of the user is brought up closer than this threshold value to display 1, this is detected by input device 4, and the approach is interpreted as an operating intention. This may be interpreted as an input which leads to a swiveling of the graphical object, as explained later in detail. Input device 4 detects the position and the movement of the hand of the user in the location area. In so doing, various gestures performed by the hand are recognized and interpreted as inputs.

For example, input device 4 may include infrared-light sources and infrared-light receivers, which detect the infrared light reflected by the hand. Details of such an input device are described in German Published Patent Application No. 100 58 244, whose disclosure on this matter is hereby incorporated into the present specification by reference thereto. Further input devices which may be used in conjunction with the display device are described in the following publications: German Published Patent Application Nos. 103 05 341 and 10 2004 048 956.

Furthermore, the position of the hand and the change in position over time may also be detected by an optical system. In this system, for example, a light-emitting diode emits square-wave, amplitude-modulated light. This light is reflected by the object to be detected, i.e., the hand, and after the reflection, arrives at a photodiode. A further light-emitting diode likewise emits square-wave, amplitude-modulated light to the photodiode, this light, however, being phase-shifted by 180°. At the photodiode, the two light signals superimpose and cancel each other out if they have exactly the same amplitude. If the signals do not cancel each other out at the photodiode, the light emission of the second diode is regulated via a control loop such that the total received signal again adds up to zero. If the position of the object changes, the light component which arrives at the photodiode from the first light-emitting diode via the reflection at the object also changes. This brings about a correction of the intensity of the second light-emitting diode through the control loop. The control signal is therefore a measure for the reflection of the light, which is emitted by the first diode, at the object. In this manner, a signal which is characteristic for the position of the object may be derived from the control signal.

In addition, the input device may be a touch-sensitive foil, which, for example, is provided on display 1. The position at which display 1 disposed behind the foil is touched may be detected by the foil. For example, the foil may take the form of a resistive touch foil, capacitive touch foil or piezoelectric foil. In addition, the foil may be formed such that a flow of heat, which emanates from the finger of a user, for example, is measured. Various inputs may be obtained from the development of the touching of the foil over time. For instance, in the simplest case, the touching of the foil at a specific position may be assigned to a graphical object 6 displayed on display 1. In addition, sliding movements of the finger over the foil and gestures on the foil are able to be interpreted. In particular, in this manner, the user is able to define a line on display 1 by touching the foil at one point, sliding to another point on the foil and removing the finger from the foil at the other point.

Furthermore, a remote operating element may be used as input device. In particular, the remote operating element is a mechanical operating element. For instance, a rotary switch may be provided by which buttons of graphical objects 6 shown on display 1 are controllable and are selectable by pressing the rotary switch. In addition, separate pressure-operated switches or momentary-contact switches may be positioned around the rotary switch. The display device may include a multifunction operating device, for example, as described in European Patent No. 1 212 208.

According to a further exemplary embodiment, the input device includes a pressure-sensitive surface, by which the force exerted during manipulation of the input device may be detected. The pressure-sensitive surface may be what is referred to as a touchpad. A surface of an operating element may also include the pressure-sensitive surface. Finally, display 1 may have the pressure-sensitive surface, so that in this case, the input device is a pressure-sensitive touchscreen.

According to example embodiments of the pressure-sensitive input device, the surface is in operative connection with a first layer that has a plurality of conductive tracks which are aligned in a first direction on the surface of the layer. A second layer is further provided which also has a plurality of conductive tracks that are aligned in a second direction on the surface of the second layer. A deformable dielectric diaphragm is disposed between the two layers. Due to the configuration of the two layers and the diaphragm, with the aid of the conductive tracks of the two layers, it is possible to obtain a capacitance indicator when a force is exerted on the first layer. This capacitance indicator indicates the magnitude of the force which is exerted on the surface at the respective positions. Further details and refinements may be gathered from European Patent No. 1 840 715, which is incorporated by reference thereto.

The pressure-sensitive surface of the input device includes four operating elements, for example, which indicate arrows that specify in what direction a list shown on display 1 should be scrolled through, or in what direction the portion displayed by display 1, such as a section in a virtual plane, should be shifted.

Control device 2 is also coupled to a vehicle bus 7. Control device 2 is connected to driver-assistance systems of the vehicle via vehicle bus 7. Control device 2 receives data from these driver-assistance systems via vehicle bus 7, and prepares these data so that they are displayed graphically to the driver or the vehicle occupants via display 1. For this purpose, control device 2 generates graphic data for objects 6, displayable on display 1, which, inter alia, graphically represent the information of the driver-assistance systems, e.g., with the aid of lists. Control device 2 is further connected via vehicle bus 7 to various information devices and communication devices, as well as entertainment devices of the vehicle. The varied information from these vehicle devices is prepared in control device 2 and converted into graphic data for a graphical representation. Control device 2 may include an arithmetic logic unit for animations of the graphical representation on display 1.

To generate the graphic data, which are intended to be displayed by display 1, control device 2 is connected to a memory 3 for the storage or buffering of data. The data may include what is termed gross information, which is assigned to a specific informational field. Only a portion of this gross information is displayable on display 1.

In the following, with reference to FIGS. 2 and 3, the method according to an example embodiment of the present invention is explained, which is able to be implemented by the devices described above:

In this exemplary embodiment, the gross information is a list 8 having a plurality of list entries 9, of which only a portion is displayed. The number of list entries 9 of the displayed portion is a function of the size of display 1 and the enlargement factor for the display of list 8. FIG. 2 shows the case in which a total of 15 list entries 9 of list 8 are displayed by display 1 in three columns. The displayed portion may now be altered by an operator action on the part of a user. In particular, the user may induce scrolling. In this context, successive display images are rendered on display 1, in which list entries 9 disappear one after another and other list entries are displayed. For instance, if, starting from the display in FIG. 2, the user induces a scroll to the right, initially the left five list entries 9 disappear, and after the third column with list entries 9, a further column with list entries appears.

Figure 2:
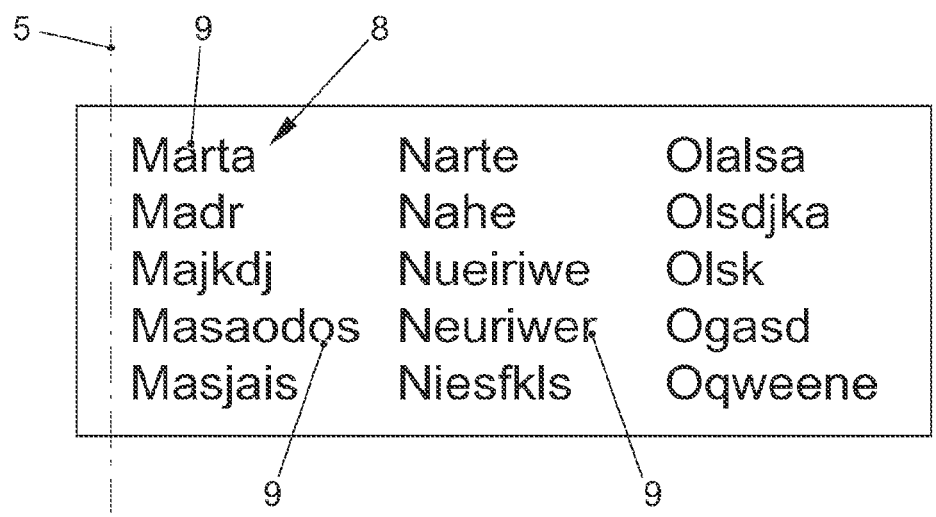
FIGS. 2 and 3 show representations on the display, generated by a method according to an exemplary embodiment of the present invention, in which the graphical object is swiveled.
Figure 3:
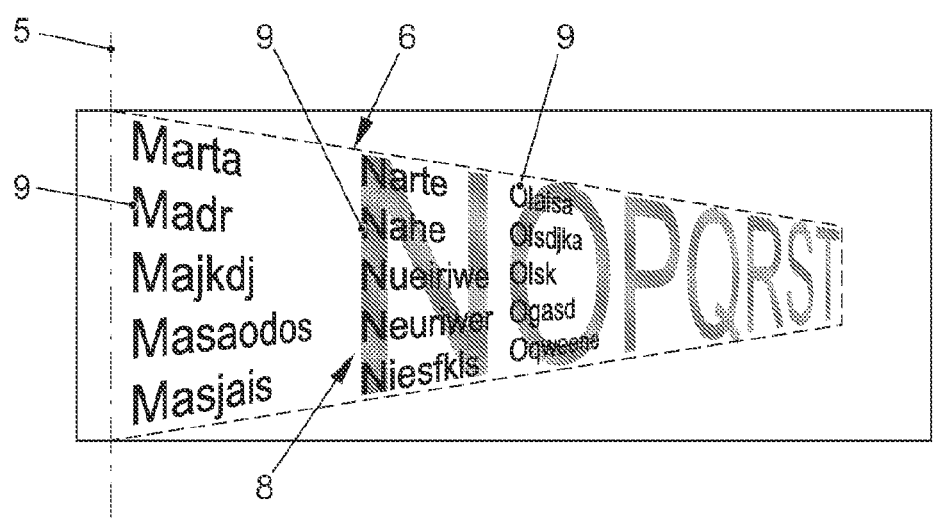

In response to the operator action, by which the user is able to scroll through list 8, control unit 2 further generates a control signal which alters the representation of list 8 such that it changes over to the second display mode shown in FIG. 3. In this second display mode, list 8, or graphical object 6 which contains list 8, is shown swiveled about axis 5 in a perspective manner or, in the case of an autostereoscopic display, in three-dimensional manner relative to the first display mode of object 6 or of list 8 shown in FIG. 2. More list entries 9 are able to be displayed in this display mode than is possible in the first display mode shown in FIG. 2. The portion of the gross information conveyed by object 6 is therefore greater in the second display mode than the portion of the gross information conveyed by object 6 in the first display mode. As FIG. 3 shows, not only is object 6 itself represented perspectively or three-dimensionally, but also the information conveyed by object 6, that is, list 8. Since areas further to the back are shown smaller in the perspective or three-dimensional representation, in the second display mode, as shown in FIG. 3, space is obtained to display further information, i.e., in the present case, further list entries.

In the exemplary embodiment described here, list 8 is hierarchically structured. In a hierarchically higher level, only the initial letters of the list entries are displayed; in the next lower hierarchy level, list entries 9 themselves are displayed. In the second display mode shown in FIG. 3, the perspectively or three-dimensionally front areas are shown with a greater depth of detail, that is, a lower hierarchy level is displayed, and areas situated perspectively or three-dimensionally further to the back are shown with fewer details, that is, a higher hierarchy level is displayed. In the present case, for the initial letters "M", "N" and "O", list entries 9 themselves are displayed, and for the initial letters starting from "P", only the initial letters are displayed Thus, this display in the second display mode gives a preview for scrolling through list 8.

In this context, it is precisely the areas which are also displayed in the first display mode shown in FIG. 2 that are displayed with a greater depth of detail in the second display mode shown in FIG. 3. The areas adding on in the second display mode are therefore displayed in a higher hierarchy level.

In the following, various operator actions are described by which a user is able to scroll through list 8. However, the operator actions have the feature that they simultaneously cause control device 2 to generate a control signal by which graphical object 6, having list 8, is swiveled about axis 5 perspectively or three-dimensionally to the back, the change in the display mode described above thereby resulting.

If the input device is a touch-sensitive surface, i.e., a touchscreen or a touchpad, the operator action may be a so-called wiping gesture, which the user performs with his finger on the touch-sensitive surface. If input device 4 is able to detect a gesture, e.g., by the hand of the user, in front of display 1, this wiping gesture may also be performed in front of display 1 without it being necessary for the user to touch display 1. During the operating movement which the user performs in the wiping gesture, the speed of the operating movement is detected. The speed with which list 8 is scrolled is then produced as a function of the speed of the operating movement. A quickly performed wiping gesture causes a fast scroll through list 8, while a slowly performed wiping gesture causes a slow scroll through list 8. At the same time, in response to the wiping gesture, object 6 is swiveled about axis 5 perspectively or three-dimensionally to the back. This swiveling movement is represented as animation, this animation being realized as though object 6 were a real object having inertia. Therefore, during the movement of object 6, an accelerating and decelerating behavior is manifested as would be expected of real objects having inertia. For example, during the animation, object 6 cannot enter directly into the position shown in FIG. 3, but rather executes an oscillatory motion before it reaches the final state.

Furthermore, the swiveling angle about which graphical object 6 is swiveled is a function of the speed of the operator action. A quickly performed wiping gesture results in object 6 being swiveled about a larger swiveling angle than is the case if the wiping gesture is performed more slowly. However, the swiveling angle does not exceed a maximum swiveling angle that lies, for example, in a range between 35° and 55°. In particular, the maximum swiveling angle is 45°.

Due to the wiping gesture, the user is therefore able to scroll through list 8, while at the same time, a greater preview of remote list entries 9 is given due to the swiveling of graphical object 6 which contains list 8. If the user slows down his wiping gesture for scrolling through list 8, graphical object 6 having list 8 is swiveled again in the direction of the display mode shown in FIG. 2, which shows a top view of graphical object 6. If the operator action, i.e., the wiping gesture, is ended, the representation of graphical object 6 returns again to the initial state shown in FIG. 2, however, a different portion of total list 8 being displayed after the scrolling. For instance, the user may now select one list entry 9 via input device 4 by, for example, tapping the touch-sensitive surface of display 1 at corresponding list entry 9.

If the operator action is carried out via a different input device such as a remote operating element having rotary switches, pressure-operated switches or momentary-contact switches or a pressure-sensitive operating element, the angle of rotation of a rotary actuator, the duration of the actuation of a pressure-operated switch or momentary-contact switch as well as possibly the magnitude of the force exerted on a pressure-sensitive surface is detected and converted into a control signal for the scroll through list 8, as well as for the swiveling of graphical object 6.

LIST OF REFERENCE NUMERALS

1 Display
2 Control device
3 Memory
4 Input device
5 Swivel axis 6 Graphical object
7 Vehicle bus
8 List
9 List entries

The invention claimed is:

1. A method for displaying information, comprising:
graphically representing at least one object to convey a portion of gross information in at least one first display mode by a display;
generating, as a function of a control signal of a control device, graphic data adapted to alter the representation of the graphical object to change the graphical object over to at least one second display mode;
in the second display mode, showing the object swiveled about an axis in at least one of (a) a perspective and/or (b) a three-dimensional manner relative to the first display mode of the object;
wherein the portion of the gross information conveyed by the object is greater in the second display mode than the portion of the gross information conveyed by the object in the first display mode.

2. The method according to claim 1, wherein the display is arranged in a vehicle.

3. The method according to claim 1, wherein the control device alters the graphic data such that the portion is represented at least one of (a) perspectively and/or (b) three-dimensionally in the second display mode, a type of at least one of (a) the perspective representation and/or (b) the three-dimensional representation being a function of the swiveling angle.

4. The method according to claim 3, wherein a size of the portion conveyed by the graphical object is a function of the swiveling angle by which the graphical object is swiveled.

5. The method according to claim 1, wherein the control device alters the graphic data such that in the second display mode, the information displayed at least one of (a) perspectively and/or (b) three-dimensionally in front is rendered with a greater depth of detail than information displayed perspectively to the back.

6. The method according to claim 1, further comprising:
generating the control signal in response to an operator action by a user; and
altering the displayed portion of the gross information based on the operator action.

7. The method according to claim 1, wherein the gross information includes a list having a plurality of list entries, of which only a portion is displayed, and a number of list entries in the portion is a function of the swiveling angle.

8. The method according to claim 6, wherein upon conclusion of the operator action, the swiveling angle is reset to an original value at which the object conveys the portion of the gross information in the first display mode.

9. The method according to claim 6, wherein during the operator action, an operating movement is performed whose speed is detected, and at least one of (a) the swiveling angle and/or (b) a speed with which the displayed portion of the gross information changes is a function of the speed of the operating movement.

10. The method according to claim 6, wherein an operating duration is defined for the operator action and detected, and at least one of (a) the swiveling angle and/or (b) a speed with which the displayed portion of the gross information changes is a function of the operating duration.

11. The method according to claim 6, further comprising detecting a force exerted by the user during the operator action, at least one of (a) the swiveling angle and/or (b) a speed with which the displayed portion of the gross information changes is a function of the force exerted by the user during the operator action.

12. A display device, comprising:
a display adapted to graphically represent information;
a memory adapted to store gross information;
a control device adapted to generate graphic data to render at least one graphical object, displayable on the display, in a first display mode in which a portion of the gross information stored in the memory is displayed; and
an input device adapted to generate a control signal in response to an operator action;
wherein the control device is adapted to alter the graphic data to change the graphical object over to at least one second display mode in which the object is shown swiveled about an axis in at least one of (a) a perspective and/or (b) a three-dimensional manner relative to the first display mode of the object; and
wherein the portion of the gross information conveyed by the object in the second display mode is greater than the portion of the gross information conveyed by the object in the first display mode.

13. The display device according to claim 12, wherein the display device is arranged as a vehicle display device.

14. The display device according to claim 12, wherein the gross information includes a list having a plurality of list entries, of which only a portion is displayable, and a number of list entries in the portion is a function of the swiveling angle.

15. The display device according to claim 12, wherein the input device includes a touch-sensitive surface.

16. The display device according to claim 12, wherein the input device is pressure-sensitive and is adapted to detect a force exerted during the actuation of the input device.

* * * * *